Figure 3:
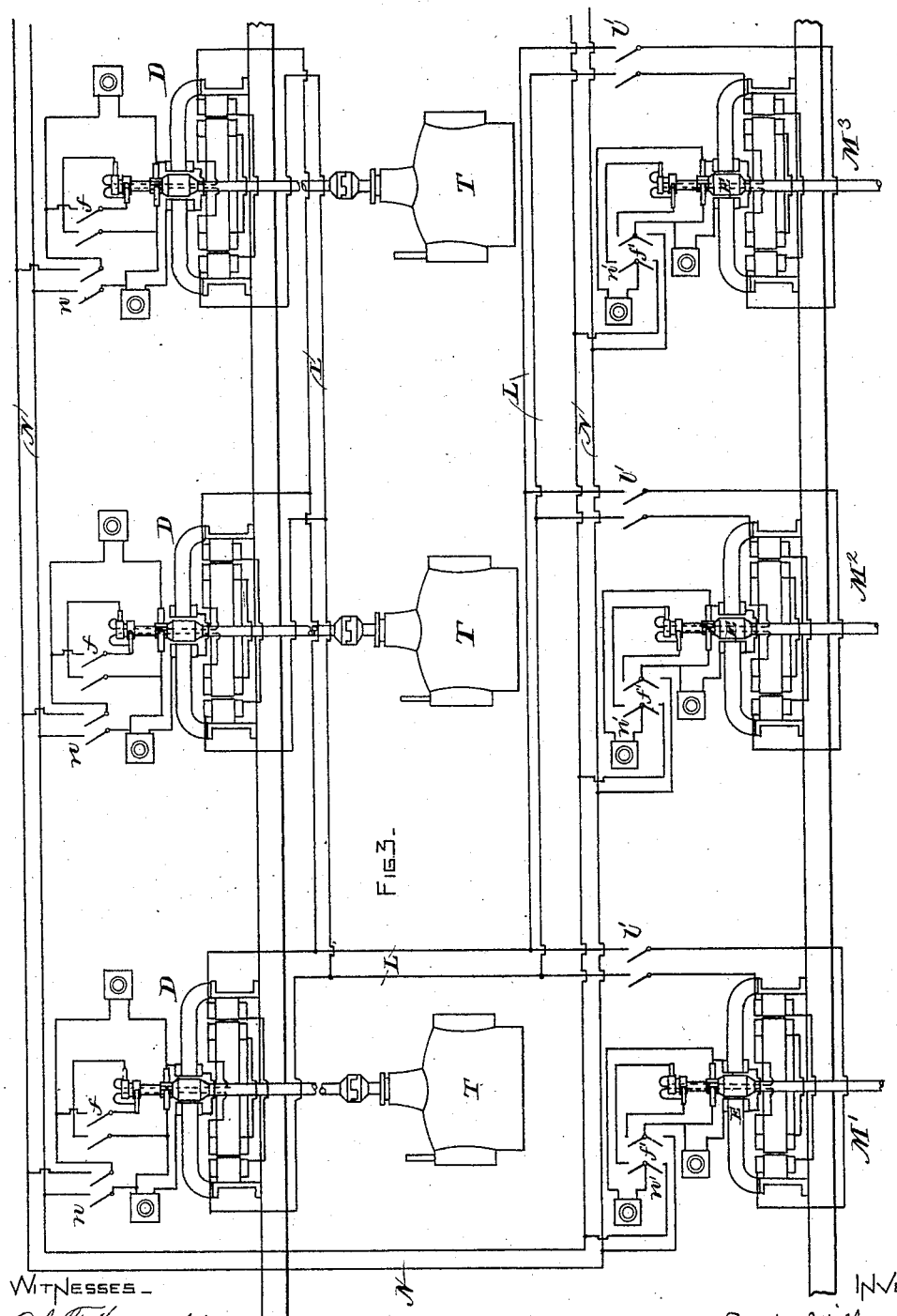

(No Model.) 2 Sheets—Sheet 1.
E. W. RICE, Jr.
ELECTRIC TRANSMISSION OF POWER.
No. 485,658. Patented Nov. 8, 1892.
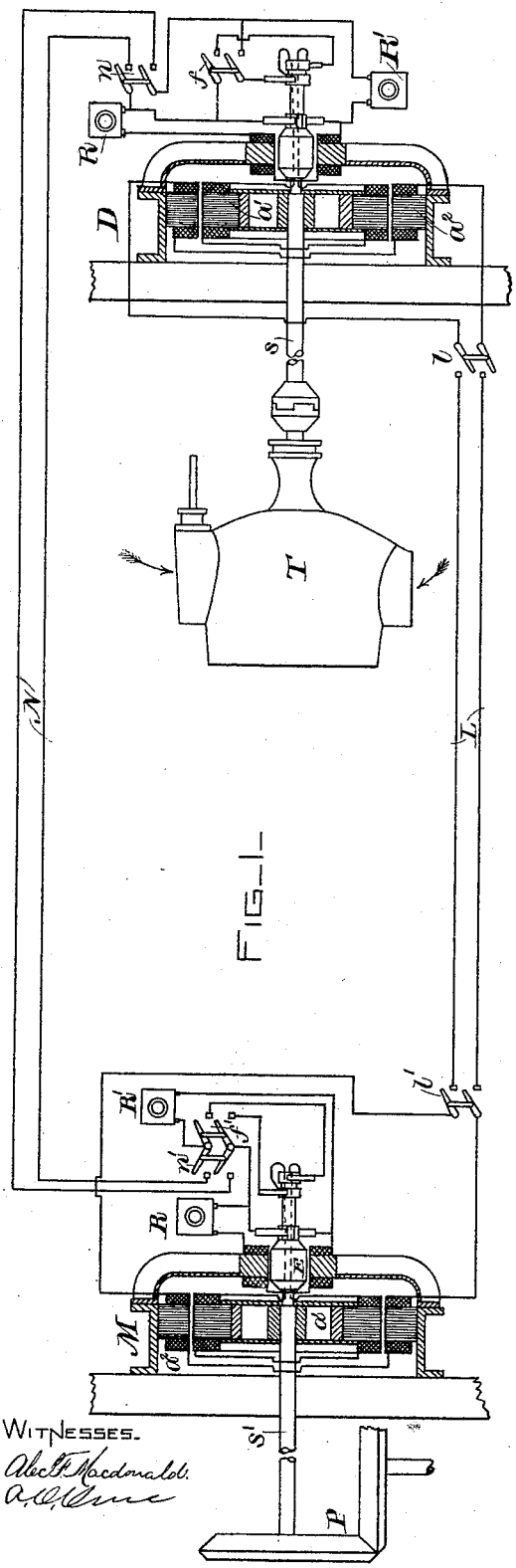
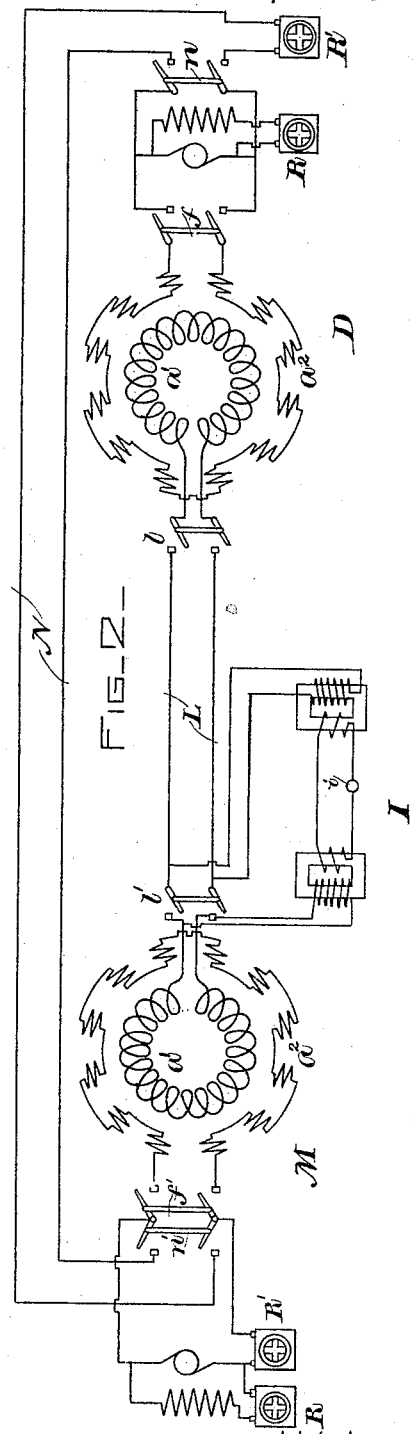
WITNESSES:
Alec F. Macdonald
A. C. Vine
INVENTOR
Edwin Wilbur Rice Jr
by Bentley & Blodgett
Attys (No Model.) 2 Sheets—Sheet 2.

E. W. RICE, Jr.
ELECTRIC TRANSMISSION OF POWER.

No. 485,658. Patented Nov. 8, 1892.

WITNESSES
Alec F. Macdonald
A. C. One

INVENTOR
Edwin Wilbur Rice Jr
by Bentley & Blodgett
Attys

UNITED STATES PATENT OFFICE.

EDWIN WILBUR RICE, JR., OF LYNN, MASSACHUSETTS, ASSIGNOR TO THE THOMSON-HOUSTON ELECTRIC COMPANY, OF CONNECTICUT.

ELECTRIC TRANSMISSION OF POWER.

SPECIFICATION forming part of Letters Patent No. 485,658, dated November 8, 1892.

Application filed September 18, 1891. Serial No. 406,113. (No model.)

*To all whom it may concern:*

Be it known that I, EDWIN WILBUR RICE, Jr., a citizen of the United States, residing at Lynn, in the county of Essex and State of Massachusetts, have invented certain new and useful Improvements in Electric Transmission of Power, of which the following is a specification.

This invention relates to those systems of electric-power transmission wherein alternating currents are employed. For the transmission of electric energy over long distances it is desirable to use an alternating current on account of the facility with which high potentials may therewith be generated and distributed and transformed to lower potentials at the translating devices. In applying such a current to motive-power transmission, however, it is also desirable to use motors wherein a direct current excites a constant field acting on the alternating current of an armature. When running in synchronism with the alternating source, such motors are quite efficient; but special means must be provided for bringing them up to speed and for maintaining the direct field-current.

In my present invention, in addition to the alternating-current mains, supplementary mains are provided, conveying from the generating-station a direct current, which is applied to an auxiliary motor, so as to start the alternating motor. This motor having been brought to speed and the alternating current having been turned on the direct current from said supplementary mains is applied to excite the field of the alternating motor. The auxiliary motor will then work as a dynamo to aid the direct-current mains in supplying the fields of the alternating motor, and such direct-current supply from the generating-station may then be cut off, a part of the energy developed by the alternating motor being applied through the auxiliary motor or dynamo to excite its own field, the remainder of such energy being available for external work.

In the accompanying drawings, Figures 1 and 2 are diagrams of a system of electric-power transmission embodying my invention, Fig. 1 indicating particularly, also, the mechanical connections of the generators and motors. Fig. 3 shows an extension of the system.

In carrying my invention into practice I prefer to employ substantially-identical apparatus at the generating and receiving stations, such apparatus at each place comprising an alternating-current machine and a direct-current machine mechanically connected, preferably, by being mounted on the same shaft. At the generating-station a prime motor T of any description is connected to the common shaft $s$ of the alternator D. At the receiving-station the alternating motor M and the direct-current machine E, which acts both as a motor and a dynamo, are mounted on a common shaft $s'$, connected to the work or load P. Alternating mains L connect the armature of the alternating dynamo with the armature of the alternating motor and have interrupting-switches $l\ l'$ preferably at both the generating and receiving stations. Direct-current mains N also lead from the generating to the receiving station and at each place are connected both to the direct-current machine (both armature and field) and to the field of the alternating machine. Switches $n\ n'$ are in each case provided, whereby the connection to the direct-current mains may be entirely broken at both the stations and additional and preferably mechanically-separate switches $f\ f'$ are provided for making and breaking the connection to the fields of the alternators.

On account of its simplicity I prefer to employ the general construction of alternating machine indicated in Fig. 1, in which a constantly-excited field $a'$ revolves within a fixed armature $a^2$. The fields of the direct-current machines are preferably shunt-wound, and regulating-rheostats R are provided in circuit therewith. Rheostats R' may also be provided in the connections to the fields of the alternating machines and are preferably so placed as to also be included in the connection between the direct-current machines and the mains N. When the switches $n\ f$ are closed, the current from each direct-current armature has three paths open to it, one through its own field-magnet and rheostat R, a second through the field-magnet $a'$ of the alternating machines, and a third through the mains and the distant armature, the rheostat R' being included in said second and third paths.

As shown in Fig. 2, an ordinary synchronism-indicator I may be provided, consisting of two transformers with primaries connected on opposite sides of the switch l' near the motor or receiver M, and secondary coils connected through a lamp i, which indicates, in a well-known manner, the synchronism or non-synchronism of the armatures $a^2$ of the two alternating machines.

The operation of the system is as follows: The prime motor having been set in operation and coupled to the combined alternating and direct current machines at the generating-stations, said direct-current machine at once excites itself through its field connection. Switch n at such station is then closed to connect this dynamo with the mains N N. The alternator is brought into action by closing its field-exciting circuit by switch f, and the alternator is connected to the mains L by closing switch l. Then when the switch n' at the receiving-station is turned on the direct-current motor E at such station is started, thus starting the alternating-current motor and bringing the same up to speed. The motor-attendant by closing switch f' energizes the alternating-motor field-circuit, causing the armature thereof to generate an alternating current. The device I, subject both to these alternating currents and those of the main-supply circuit, indicates when the two alternating machines are in synchronism, and the motor-attendant at the moment of synchronism closes the switch l', thus applying the alternating supply-current to the motor. The motor will then run in unison with the alternating generator and will work under load. The direct-current supply from the central station is then cut off at either end, when the direct-current machine E, acting as a generator, maintains the field of the alternating motor, and also its own field. The energy required for exciting the field is thus transmitted by an alternating current, which may be generated and distributed more economically than a direct current, for well-known reasons.

Fig. 3 shows the manner in which a number of alternators may be connected in multiple to distributing-mains L, feeding alternating motors M' $M^2$ $M^3$ in parallel. The direct-current machines D and E, belonging, respectively, to the generating and the motive machines, are similarly provided with parallel connections. Switches n f n' l' f' are provided, whereby the circuits of each individual motor or generator may be controlled to effect operation thereof in the above-described manner.

What I claim as new, and desire to secure by Letters Patent, is—

1. A system of electric transmission of power, comprising at both the generating and receiving stations direct and alternating current machines, corresponding direct and alternating current mains connected, respectively, to such machines, the receiving-station having its direct and alternating machines mechanically connected and having a connection separable from the direct-current mains and leading from the direct-current machine to the field of the alternating-current machine.

2. The combination of an alternating-current motor connected to alternating-current-supply mains, a direct-current motor connected to direct-current-supply mains and mechanically connected to said alternating-current motor, a connection from such direct-current motor to the field-magnet of the alternating-current motor, and a circuit-breaking switch adapted to open the connection from the direct-current motor to the direct-current-supply mains without disturbing the connection between the said direct motor and the field-magnet of the alternating motor.

3. The combination of an alternating-current motor, connections from such motor to alternating-current-supply mains, a direct-current motor or dynamo mechanically connected to such alternating-current motor, connections therefrom to direct-current-supply mains, a circuit-breaking switch in such direct-current connections, and a connection independent of such switch from the direct-current motor or dynamo to the field-magnet of the alternating motor.

4. The combination, with alternating and direct current supply mains, of an alternating motor and a direct-current motor or dynamo respectively connected to such mains and mechanically connected together, a switch in the connection for the direct-current-supply mains, and a connection independent of such switch from the direct-current motor or dynamo to the field-magnet of the alternating motor.

In witness whereof I have hereto set my hand this 10th day of September, 1891.

EDWIN WILBUR RICE, JR.

Witnesses:
ALBERT L. ROHRER,
JOHN W. GIBBONEY.